US012663574B2

(12) United States Patent　　　(10) Patent No.:　US 12,663,574 B2
Suzuki et al.　　　　　　　　　　(45) Date of Patent:　　Jun. 23, 2026

(54) DISPLAY DEVICE

(71) Applicant: ALPS ALPINE CO., LTD., Tokyo (JP)

(72) Inventors: Hajime Suzuki, Miyagi (JP);
　　　　　　　Hiromitsu Takenaka, Tokyo (JP);
　　　　　　　Hiroshi Suzuki, Miyagi (JP); **Noriyuki
　　　　　　　Takahashi**, Miyagi (JP)

(73) Assignee: ALPS ALPINE CO., LTD., Tokyo (JP)

( * ) Notice: Subject to any disclaimer, the term of this
　　　　　　patent is extended or adjusted under 35
　　　　　　U.S.C. 154(b) by 0 days.

(21) Appl. No.: 19/173,161

(22) Filed: Apr. 8, 2025

(65) Prior Publication Data

US 2025/0237802 A1　　Jul. 24, 2025

Related U.S. Application Data

(63) Continuation of application No.
　　PCT/JP2023/033678, filed on Sep. 15, 2023.

(30) Foreign Application Priority Data

Oct. 14, 2022　　(JP) ................................. 2022-165543

(51) Int. Cl.
　　*F21V 8/00*　　　　(2006.01)
(52) U.S. Cl.
　　CPC ......... G02B 6/0031 (2013.01); G02B 6/0065
　　　　　　　　　　　　　　　　　　　　(2013.01)
(58) Field of Classification Search
　　CPC .... G02B 6/0036; G02B 6/006; G02B 6/0038;
　　　　　　　G02B 6/0061; G02B 6/0018; G02B
　　　　　　　　　　　　　　　　　　　　6/002;

(Continued)

(56) References Cited

U.S. PATENT DOCUMENTS 11,719,875 B2 *　8/2023　Liu ........................ G02B 6/006
　　　　　　　　　　　　　　　　　　　　　362/606
2001/0049893 A1　12/2001　Maas et al.
　　　　　　　　　(Continued)

FOREIGN PATENT DOCUMENTS

CN　　　　1296604　　　5/2001
CN　　　102997106　　　3/2013
　　　　　　　(Continued)

OTHER PUBLICATIONS

International Search Report for PCT/JP2023/033678 mailed on
Nov. 14, 2023.

(Continued)

*Primary Examiner* — William J Carter
(74) *Attorney, Agent, or Firm* — IPUSA, PLLC

(57)　　　　　ABSTRACT

A display device includes a light source, and a light guide
which is transparent and flat, and into which light emitted
from the light source is incident from a first lateral surface,
wherein the light guide includes reflective parts at positions
corresponding to respective symbols, the reflective parts
each including a plurality of reflective surfaces inclined
relative to a bottom surface of the light guide, each of the
reflective parts reflects the light incident from the first lateral
surface from the plurality of reflective surfaces, which
results in displaying a corresponding one of the symbols on
a display surface of the light guide, and the closer the
reflective parts are to the light source, the smaller the
inclination angles of the reflective surfaces relative to the
bottom surface.

7 Claims, 5 Drawing Sheets

(58) Field of Classification Search
CPC .. G02B 6/0031; G02B 6/0043; G02B 6/0058;
F21V 8/00
See application file for complete search history.

(56) References Cited

U.S. PATENT DOCUMENTS

| | | | | |
|---|---|---|---|---|
| 2008/0007970 | A1* | 1/2008 | Lee ..................... | G02B 6/0061 |
| | | | | 385/129 |
| 2017/0146721 | A1 | 5/2017 | Fukui et al. | |
| 2018/0182201 | A1 | 6/2018 | Fujita et al. | |
| 2019/0079324 | A1* | 3/2019 | Numata ............ | G02F 1/133504 |

FOREIGN PATENT DOCUMENTS

| | | |
|---|---|---|
| CN | 107924654 | 4/2018 |
| EP | 1093105 | 4/2001 |
| JP | H07-294745 | 11/1995 |
| JP | 2003-519810 | 6/2003 |
| JP | 2016-053605 | 4/2016 |
| JP | 2019-053186 | 4/2019 |

OTHER PUBLICATIONS

Chinese First Office Action (with partial English translation) for 202380070005.9 mailed on Oct. 24, 2025.

* cited by examiner

DISPLAY DEVICE

This application is a continuation application of International Application No. PCT/JP2023/033678, filed on Sep. 15, 2023, and designated the U.S., which is based upon and claims priority to Japanese Patent Application No. 2022-165543, filed on Oct. 14, 2022. The entire contents of these applications are incorporated herein by reference.

BACKGROUND OF THE INVENTION

1. Field of the Invention

The disclosures herein relate to display devices.

2. Description of the Related Art

Patent Literature (PTL) 1 relates to a light guide plate display device that can display patterns on a display surface of a light guide of the light guide plate display device. Light emitted from a light source is incident on a lateral surface of the light guide, where the light enters the light guide. Subsequently, the light is reflected by a reflective inclined surface of a prism onto the display surface. PTL 1 discloses a technology in which an area of a reflective inclined surface of the prism positioned far from the light source device is set t be larger than an area of another reflective inclined surface of that prism positioned closer to the light source device, to balance luminance of a pattern display.

However, in the technology of PTL 1, the area of each prism is displayed differently across the plurality of pattern displays, which may create a sense of discomfort for a user who views the plurality of pattern displays.

CITATION LIST

Patent Literature

[PTL 1] Japanese Patent Laid-Open Publication No. 2016-53605

SUMMARY OF THE INVENTION

A display device includes a light source, and a light guide which is transparent and flat, and into which light emitted from the light source is incident from a first lateral surface, wherein the light guide includes reflective parts at positions corresponding to respective symbols, the reflective parts each including a plurality of reflective surfaces inclined relative to a bottom surface of the light guide, each of the reflective parts reflects the light incident from the first lateral surface from the plurality of reflective surfaces, which results in displaying a corresponding one of the symbols on a display surface of the light guide, and the closer the reflective parts are to the light source, the smaller the inclination angles of the reflective surfaces relative to the bottom surface.

According to one embodiment, the plurality of symbols can be displayed on the display surface of the light guide so that luminance is uniform without adjusting the area of the reflective part.

BRIEF DESCRIPTION OF THE DRAWINGS

FIG. 5 is a side view of a display device according to a first modification; and FIG. 6 is a side view of a display device according to a second modification.

DESCRIPTION OF THE PREFERRED EMBODIMENTS

Figure 1:
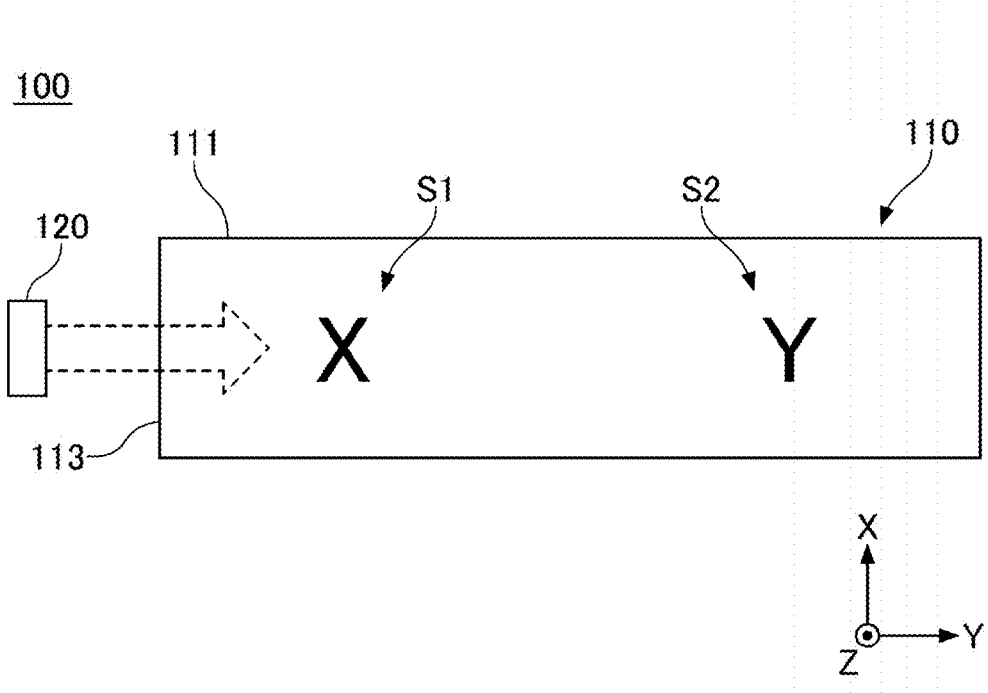
FIG. 1 is a plan view of a display device according to one embodiment.

In the following, one embodiment of the present invention will be described with reference to the accompanying drawings. In the following description, for convenience, a Z-axis side in the drawings is a vertical direction, a Y-axis side in the drawings is a horizontal direction, and an X-axis side in the drawings is a forward-rearward direction. Additionally, a positive Z-axis side is an upward direction, a positive Y-axis side is a rightward direction, a positive X-axis side is a forward direction.

(Configuration of Display Device 100)

Figure 2:
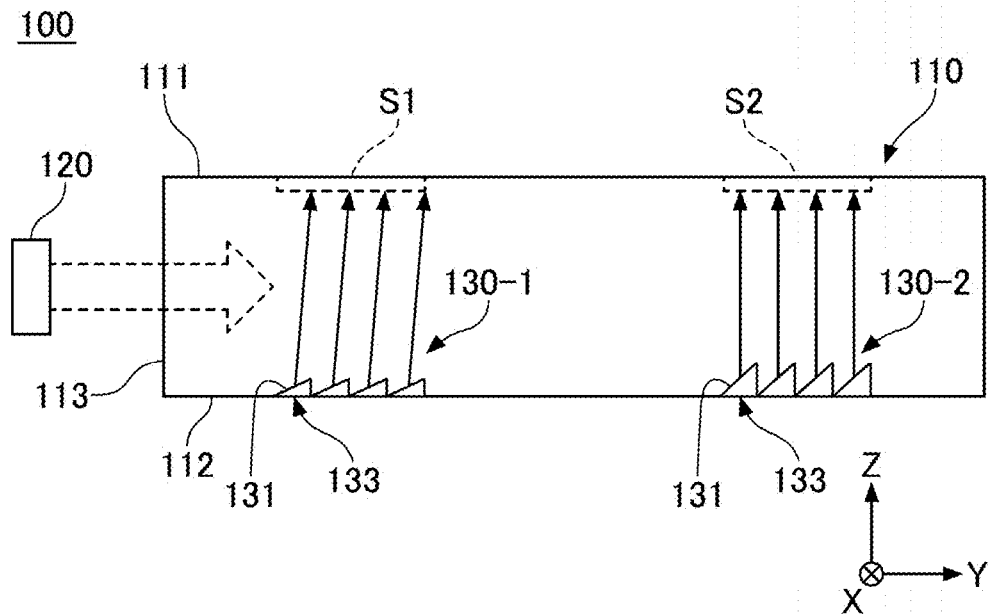
FIG. 2 is a side view of the display device according to one embodiment.

FIG. 1 is a plan view of a display device 100 according to one embodiment. FIG. 2 is a side view of the display device 100 according to one embodiment. As shown in FIGS. 1 and 2, the display device 100 includes a light guide 110 and a light source 120.

The light guide 110 is a transparent and flat member. The light guide 110 is formed of a transparent resin material. As shown in FIG. 1, the light guide 110 has a rectangular shape whose longitudinal direction is the horizontal direction (Y-axis side) in plan view from above (positive Z-axis side). As shown in FIG. 2, the light guide 110 has a flat plate shape having a constant thickness in the vertical direction (Z-axis side). The light guide 110 has a display surface 111, a bottom surface 112, a first lateral surface 113, and a plurality of reflective parts 130.

The display surface 111 is an upper surface (horizontal surface in the positive Z-axis side) of the light guide 110. When the light source 120 emits light, a plurality of symbols are displayed on the display surface 111. In an example shown in FIG. 1, when the light source 120 emits light, the symbol S1 and the symbol S2 are displayed side by side in the horizontal direction (Y-axis side) on the display surface 111. The symbol S1 is displayed in an area to the left (negative Y-axis side) of the center of the display surface 111. The symbol S2 is displayed in an area to the right (positive Y-axis side) of the center of the display surface 111. In FIG. 1, as an example, the symbol S1 is a letter "X". The symbol S2 is a letter "Y".

The bottom surface 112 is a bottom surface (horizontal surface in a negative Z-axis side) of the light guide 110. The bottom surface 112 is parallel to the display surface 111. The bottom surface 112 is provided with the plurality of reflective parts 130.

The first lateral surface 113 is a left lateral surface (lateral surface (vertical surface) in the negative Y-axis side) of the light guide 110. The first lateral surface 113 faces the light source 120 so that the light emitted from the light source 120 can enter the light guide 110.

The plurality of reflective parts 130 are provided on the bottom surface 112 of the light guide 110 at positions corresponding to the plurality of symbols. In the example shown in FIG. 2, on the bottom surface 112 of the light guide 110, two reflective parts 130-1 and 130-2 are provided side by side in the horizontal direction (Y-axis side) corresponding to two symbols S1 and S2 displayed on the display surface 111. The reflective part 130-1 is provided on the bottom surface 112 of the light guide 110 at positions corresponding to the symbol S1 (directly under the symbol S1). The reflective part 130-2 is provided on the bottom surface 112 of the light guide 110 at positions corresponding to the symbol S2 (directly under the symbol S2).

Each of the reflective parts 130-1 and 130-2 includes a plurality of reflective surfaces 131 inclined relative to the bottom surface 112. Each of the plurality of reflective surfaces 131 is inclined facing toward the first lateral surface 113 so that light propagating in the light guide 110 from the direction of the first lateral surface 113 can be reflected upward (positive Z-axis side).

The plurality of reflective surfaces 131 are arranged side by side on the bottom surface 112 so that their overall shape matches that of the corresponding symbol in plan view from above (positive Z-axis side). In other words, the plurality of reflective surfaces 131 are arranged densely within the area surrounding the outer shape of the symbol. Thus, the plurality of reflective surfaces 131 can upwardly (positive Z-axis side) reflect reflected light whose overall shape matches that of the corresponding symbol in plan view from above (positive Z-axis side), and can be viewed as the shape of the symbol.

For example, each of the plurality of reflective surfaces 131 is formed on the bottom surface 112 by forming a recess 133 which is recessed upward (positive Z-axis side) with respect to the bottom surface 112 of the light guide 110 and whose cross section is triangular when viewed in the forward-rearward direction (X-axis side).

The light source 120 is arranged on the left (negative Y-axis side) of the first lateral surface 113 of the light guide 110 so as to face the first lateral surface 113. The light source 120 is driven from a driving circuit (not shown) and emits light toward the right (positive Y-axis side), which results in radiating light toward the first lateral surface 113 of the light guide 110. Thus, the light source 120 enters the light guide 110 from the first lateral surface 113 of the light guide 110. For example, an LED (Light Emitting Diode) is used as the light source 120.

(Display Function of Display Device 100)

In the display device 100 configured as described above, when the light source 120 is driven to emit light, the light emitted from the light source 120 enters the light guide 110 from the first lateral surface 113 of the light guide 110. Most of the light entering the light guide 110 propagates while totally reflecting in the light guide 110.

A portion of the light propagating in the light guide 110 is upwardly (positive Z-axis side) reflected by the plurality of reflective surfaces 131 provided in the reflective part 130-1, and is upwardly (positive Z-axis side) emitted from the display surface 111 of the light guide 110 while maintaining the same overall shape as the shape of the symbol S1 in plan view from above (positive Z-axis side). Thus, the symbol S1 is displayed on the display surface 111 of the light guide 110, and the symbol S1 can be viewed from above (positive Z-axis side).

Another portion of the light propagating in the light guide 110 is upwardly (positive Z-axis side) reflected by the plurality of reflective surfaces 131 provided in the reflective part 130-2, so that the light is upwardly (positive Z-axis side) emitted from the display surface 111 of the light guide 110 while maintaining the same overall shape as the shape of the symbol S2 in plan view from above (positive Z-axis side). Thus, the symbol S2 is displayed on the display surface 111 of the light guide 110, and the symbol S2 can be viewed from above (positive Z-axis side).

(Inclination Angle of Reflective Surface 131)

Figure 3A:
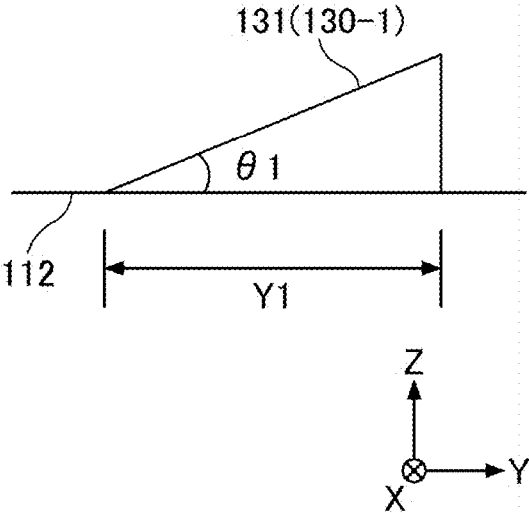
FIG. 3A is an enlarged view of a reflective surface provided in the display device according to one embodiment.
Figure 3B:
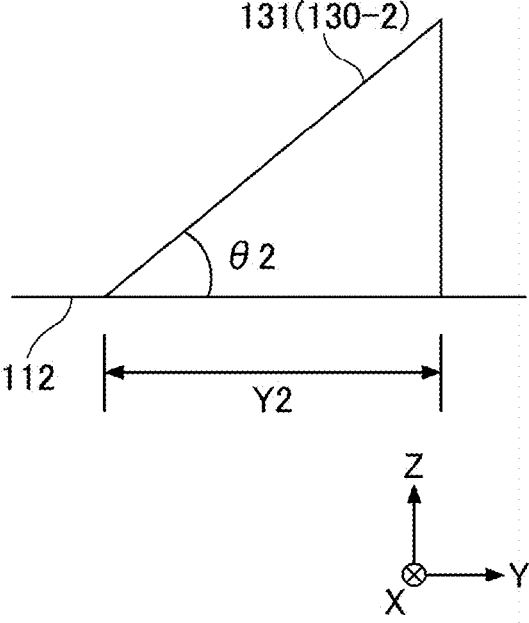
FIG. 3B is an enlarged view of the reflective surface provided in the display device according to one embodiment.

FIGS. 3A and 3B are enlarged views of the reflective surface 131 provided in the display device 100 according to one embodiment. FIG. 3A shows one of the plurality of reflective surfaces 131 provided in the reflective part 130-1. FIG. 3B shows one of the plurality of reflective surfaces 131 provided in the reflective part 130-2.

In the display device 100 according to one embodiment, an inclination angle of the reflective surface 131 with respect to the bottom surface 112 decreases as the reflective part 130 is closer to the light source 120.

For example, in the example shown in FIG. 2, the reflective part 130-1 is closer to the light source 120 than the reflective part 130-2. Therefore, as shown in FIG. 3, an inclination angle $\theta 1$ of the plurality of reflective surfaces of 131 the reflective part 130-1 is smaller than an inclination angle $\theta 2$ of the plurality of reflective surfaces 131 of the reflective part 130-2.

As a result, a direction of the reflected light with a maximum quantity of light deviates from the vertical direction. This allows the display device 100 according to one embodiment to reduce the quantity of light reflected toward the symbol S1 (upward and vertical direction) by the plurality of reflective surfaces 131 (i.e., light emitted from display surface 111 to display the symbol S1) out of the light emitted to the reflective part 130-1, compared to a case where the direction of the reflected light having the maximum quantity of light is vertical.

Conversely, in the display device 100 according to one embodiment, since the direction of the reflected light having the maximum quantity of light is set to the vertical direction in the reflective part 130-2 farther from the light source 120, a component of the quantity of light of the light (i.e., light emitted from display surface 111 to display symbol S2) reflected by the plurality of reflective surfaces 131 toward the direction of the symbol S2 (upward and vertical direction) among the light emitted to the reflective part 130-2 can be increased.

Note that the quantity of light tends to be the maximum quantity of light in a predetermined direction and decreases when it deviates from the predetermined direction, but in the reflective part 130-2, the direction of the maximum quantity of light is set to the vertical direction, but in the reflective part 130-1, the inclination angle $\theta 1$ is made smaller than the inclination angle $\theta 2$ so that the direction of the maximum quantity of light is shifted to the direction opposite to the light source.

Here, in the display device 100 according to one embodiment, since the reflective part 130-1 closer to the light source 120 is closer to the light source 120, the quantity of light of the light emitted to the reflective part 130-1 is relatively large (the attenuation amount is small because a number of total reflections is small), and the luminance of the symbol S1 is relatively high as it is. However, by setting the inclination angle $\theta1$ of the reflective surface 131 as described above, the quantity of reflected light by the reflective surface 131 can be relatively reduced, allowing the luminance of the symbol S1 to be lowered to an appropriate level.

Conversely, in the display device 100 according to one embodiment, since the reflective part 130-2 closer to the light source 120 is closer to the light source 120, the quantity of light of the light emitted to the reflective part 130-2 is relatively small (the attenuation amount is large because the number of total reflections is large), and the luminance of the symbol S2 is relatively low as it is. However, by setting the inclination angle $\theta2$ of the reflective surface 131 as described above, the quantity of reflected light by the reflective surface 131 can be enhanced to the maximum, allowing the luminance of the symbol S2 to be heightened.

Therefore, according to the display device 100 according to one embodiment, the luminance difference between the luminance of the symbol S1 displayed on the display surface 111 of the light guide 110 and the luminance of the symbol S2 can be reduced. Therefore, according to the display device 100 according to one embodiment, the plurality of symbols can be displayed on the display surface 111 of the light guide 110 so that the luminance is uniform without adjusting the area of the reflective part 130.

In the present embodiment, as an example, the inclination angle of the plurality of reflective surfaces 131 provided by one of the reflective parts 130-1 and 130-2 is equal. However, it is not limited to this, and the inclination angle of the plurality of reflective surfaces 131 provided by any one of the reflective parts 130-1 and 130-2 may be made different according to the distance from the light source 120.

(Projected Area of Reflective Surface 131)

In addition, in the display device 100 according to one embodiment, a projected area of each of the reflective surfaces 131 is equal for all the reflective parts 130 in plan view when seen from a direction of the display surface 111 of the light guide 110.

For example, as shown in FIG. 3, although the inclination angles of the reflective surface 131 of the reflective part 130-1 and the reflective surface 131 of the reflective part 130-2 are different from each other, the width Y1 of the reflective surface 131 of the reflective part 130-1 in the horizontal direction (Y-axis side) and the width Y2 of the reflective surface 131 of the reflective part 130-2 in the horizontal direction (Y-axis side) are equal to each other. Although not shown, the width of the reflective surface 131 of the reflective part 130-1 in the forward-rearward direction (X-axis side) and the width of the reflective surface 131 of the reflective part 130-2 in the forward-rearward direction (X-axis side) are equal to each other.

Therefore, the reflective surface 131 of the reflective part 130-1 and the reflective surface 131 of the reflective part 130-2 in plan view from the display surface 111 (positive Z-axis side) of the light guide 110 have respective projected areas equal to each other. Furthermore, the plurality of reflective surfaces 131 of the reflective part 130-1 and the plurality of reflective surfaces 131 of the reflective part 130-2 in plan view from the display surface 111 (positive Z-axis side) of the light guide 110 are equally spaced, and their arrangement has equal density.

Therefore, according to the display device 100 according to one embodiment, when the light source 120 is not lit, difference in apparent luminance caused by the projected area of the reflective surface 131 of the symbols S1 and S2 displayed on the display surface 111 of the light guide 110 can be reduced. That is, when the light source 120 is not lit, the reflective surface 131 reflects ambient light and the surface of the reflective surface 131 may appear whitish. Even though the individual reflective surfaces 131 are extremely small and therefore hardly perceptible when viewed directly in plan view from the display surface 111 side (positive Z-axis side), differences in their projected area result in a difference in apparent brightness when the symbol is viewed as a whole. However, according to the display device 100 according to one embodiment, since the projected area of each reflective surface 131 is equal among the plurality of symbols displayed on the display surface 111 of the light guide 110, the user who views the plurality of symbols does not feel a sense of discomfort.

In the present embodiment, the projected area of the reflective surface 131 of the reflective part 130-1 and the reflective surface 131 of the reflective part 130-2 are equal, but instead, the actual area of the reflective surface 131 of the reflective part 130-1 and the reflective surface 131 of the reflective part 130-2 may be equal. In this case, the projected a of the reflective surface 131 of the reflective part 130-1 and the reflective surface 131 of the reflective part 130-2 are different, but, for example, by reducing the projected area, the reflective surface 131 can be densely arranged, and the like.

(Example of Setting of Inclination Angle of Reflective Surface 131)

Figure 4A:
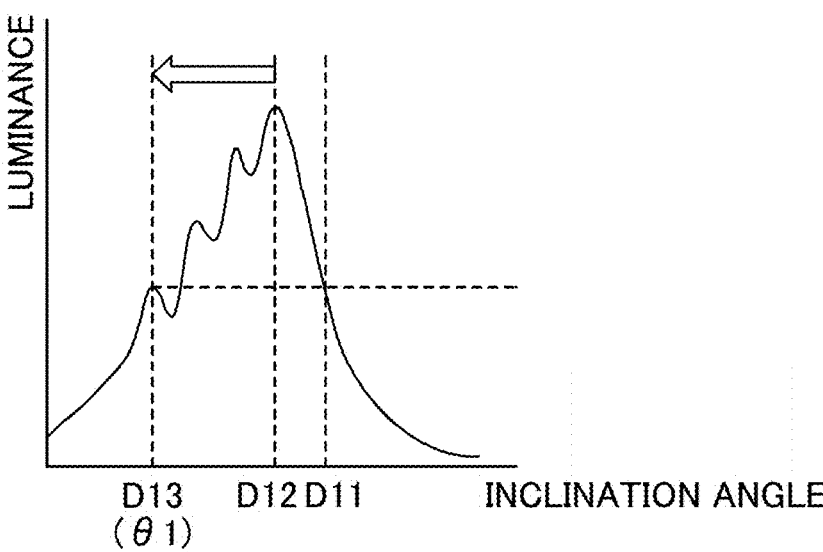
FIG. 4A is a drawing illustrating a relationship between an inclination angle of a reflective surface and luminance of a symbol in the display device according to one embodiment.

FIGS. 4A and are 4B drawings illustrating relationship between the inclination angle of the reflective surface 131 and the luminance of the symbols in the positive Z-axis side (above the symbols and in the vertical direction) in the display device 100 according to one embodiment, and the result obtained by simulation.

In the display device 100 according to one embodiment, the inclination angles of the reflective surfaces 131 are set for each of the plurality of reflective parts 130-1 and 130-2, so that the symbols displayed on the display surface 111 of the light guide 110 have equal luminance.

Figure 4B:
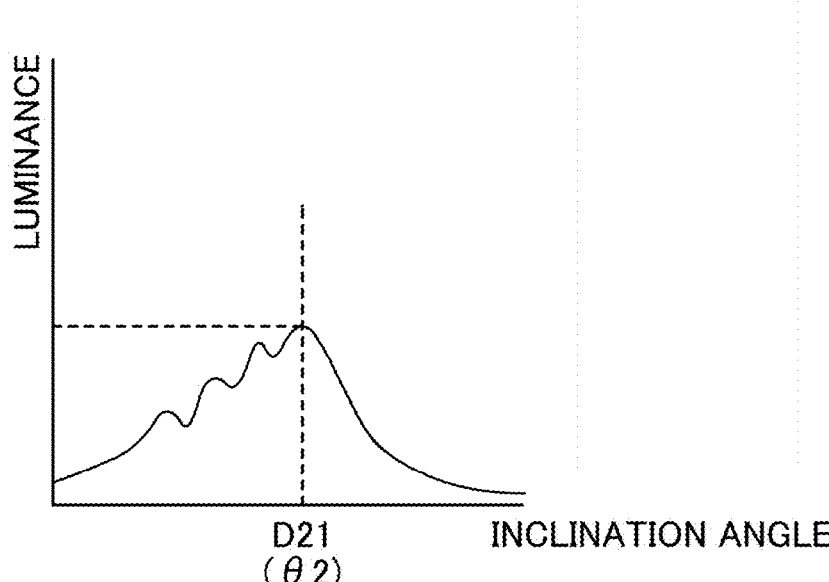
FIG. 4B is a drawing illustrating the relationship between the inclination angle of the reflective surface and the luminance of the symbol in the display device according to one embodiment.

FIG. 4A is a drawing illustrating the relationship between the inclination angle of the reflective surface 131 provided in the reflective part 130-1 and the luminance of the symbol S1 displayed on the display surface 111. FIG. 4B is a drawing illustrating the relationship between the inclination angle of the reflective surface 131 provided in the reflective part 130-2 and the luminance of the symbol S2 displayed on the display surface 111.

In graphs shown in FIGS. 4A and 4B, the inclination angle of the horizontal axis means the inclination angle of the reflective surface 131 with respect to the bottom surface 112.

As shown in FIG. 4B, in the reflective part 130-2 farther the light source 120, the from inclination angle D21 at which the luminance of the symbol S2 is maximum is set as the inclination angle $\theta2$ of the plurality of reflective surfaces 131.

Thus, the reflective part 130-2 (i.e., one of the reflective parts 130 farthest from the light source 120) has the inclination angles of the plurality of reflective surfaces 131 set to obtain the maximum luminance when the symbol S2 corresponding to the reflective part 130-2 is viewed from a direction of the display surface 111.

As shown in FIG. 4A, in the reflective part 130-1 closer to the light source 120, the inclination angle D13 at which the luminance of the symbol S1 is equal to the luminance of the symbol S2 is set as the inclination angle $\theta1$ of the plurality of reflective surfaces 131.

However, as shown in FIG. 4A, on the reflective surface 131 of the reflective part 130-1, there are two inclination angles at which the luminance of the symbol S1 is equal to the luminance of the symbol S2, inclination angle D11 and inclination angle D13 with inclination angle D12 at which the luminance of the symbol S1 becomes the maximum value. In this case, as shown in FIG. 4A, the smaller inclination angle D13 is set as inclination angle θ1 of the plurality of reflective surfaces 131.

This is to minimize the impact of dimensional errors in the inclination angle. Specifically, as shown in FIG. 4A, an inclination of a curve showing the relationship between the inclination angle of the reflective surface 131 and the luminance of the symbol S1 is larger at inclination angle D11 than at inclination angle D13. Therefore, even if the inclination angle deviates from the reference angle due to processing for installation, the impact of inclination angle D13 on the change in luminance is smaller. This is because the light emitted from the light source 120 is light toward the positive Y-axis side, and when the inclination angle of the reflective surface increases, an incidence angle (reflection angle) of the light to the reflective surface tends to decrease, and when the incidence angle is small, the luminance changes greatly because the light is emitted without total reflection. Conversely, when an angle of the reflective surface decreases, a reflection angle of the light to the reflective surface tends to increase, and the luminance does not greatly change because the light that is totally reflected remains totally reflected.

Thus, the display device 100 according to one embodiment can easily equalize the luminance of the symbol S1 and the luminance of the symbol S2 displayed on the display surface 111 of the light guide 110.

The appropriate inclination angles θ1 and θ2 of the reflective surface 131 can be obtained by a predetermined formula, simulation, or the like.

First Modification

Figure 5:
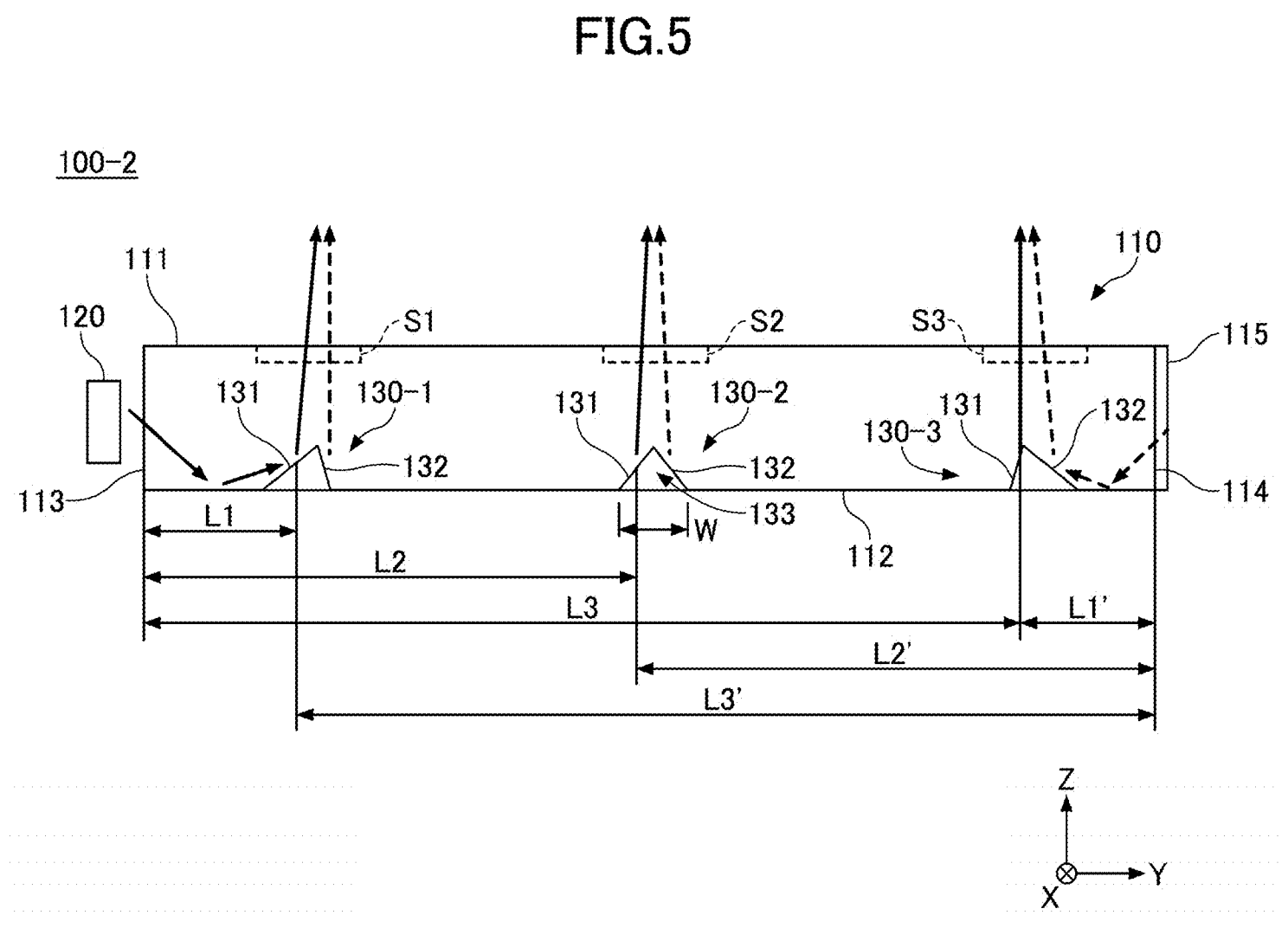

A first modification of the display device 100 according to one embodiment will be described below with reference to FIG. 5. FIG. 5 is a side view of a display device 100-2 according to the first modification As shown in FIG. 5, the display device 100-2 according to the first modification includes, as an example of the plurality of reflective parts 130, a reflective part 130-1, a reflective part 130-2, and a reflective part 130-3 in order from the light source 120 (negative Y-axis side).

The reflective part 130-1 causes the symbol S1 to be displayed on the display surface 111 of the light guide 110. The reflective part 130-2 causes the symbol S2 to be displayed on the display surface 111 of the light guide 110. The reflective part 130-3 causes the symbol S3 to be displayed on the display surface 111 of the light guide 110.

Each of the reflective parts 130-1, 130-2, and 130-3 has a plurality of reflective surfaces 131 facing the first lateral surface 113 (negative Y-axis side) on the bottom surface 112 of the light guide 110. For convenience, FIG. 5 shows one of the plurality of reflective surfaces 131 provided by the reflective parts 130-1, 130-2, and 130-3.

As shown in FIG. 5, in the display device 100-2 according to the first modification, the light guide 110 has a lateral reflective part 115 on the second lateral surface 114 which is a surface opposite to the first lateral surface 113. The lateral reflective part 115 is provided so as to cover the entire area of the second lateral surface 114. The lateral reflective part 115 reflects the light incident on the second lateral surface 114 among the light propagating inside the light guide 110 back into the interior of the light guide 110. Thus, the display device 100-2 according to the first modification can also cause the light from the second lateral surface 114 (positive Y-axis side) to reach the reflective parts 130-1, 130-2, and 130-3, which results in improving the luminance of each symbol on the display surface 111. As the lateral reflective part 115, for example, a reflecting sheet made of aluminum, a white reflecting sheet, or a white paint may be used.

As shown in FIG. 5, in the display device 100-2 according to the first modification, each of the reflective parts 130-1, 130-2, and 130-3 has a second reflective surface 132 that is oriented toward the lateral reflective part 115 (positive Y-axis side) and that is integrally formed with a corresponding one of the plurality of reflective surfaces 131.

Here, in the display device 100-2 according to the first modification, the closer the reflective part 130 is to the first lateral surface 113, the smaller the inclination angle of the reflective surface 131 relative to the bottom surface 112 of the light guide 110.

As a result, in the display device 100-2 according to the first modification, the reflective part 130 closer to the first lateral surface 113 receive a greater quantity of light irradiated from the first lateral surface 113 side (negative Y-axis side) because they are closer to the light source 120, but the quantity of light emitted from the first lateral surface 113 (negative Y-axis side) that is reflected by the plurality of reflective surfaces 131 toward the symbol direction (upward and vertical direction) (i.e., light emitted from the display surface 111 to display the symbol) can be relatively reduced.

Further, in the display device 100-2 according to the first modification, the closer the reflective part 130 is to the lateral reflective part 115, the smaller the inclination angle of the second reflective surface 132 relative to the bottom surface 112 of the light guide 110.

Thus, in the display device 100-2 according to the first modification, the quantity of light emitted from the lateral reflective part 115 (positive Y-axis side) is larger as the reflective part 130 closer to the lateral reflective part 115 is closer to the lateral reflective part 115, but the quantity of light emitted from the lateral reflective part 115 (positive Y-axis side) that is reflected toward the symbol direction (upward and vertical direction) by the plurality of second reflective surfaces 132 (i.e., light emitted from the display surface 111 to display the symbol) can be relatively small.

For example, since the distance L1 from the first lateral surface 113 is short, the quantity of light emitted from the first lateral surface 113 (negative Y-axis side) is relatively large in the reflective part 130-1, but since the inclination angle of the reflective surface 131 with respect to the bottom surface 112 is relatively small, the quantity of light reflected in the direction (upward and vertical direction) of the symbol S1 by the reflective surface 131 can be relatively small, and therefore, the luminance of the symbol S1 displayed on the display surface 111 can be set to an appropriate amount.

Moreover, since the distance L3' from the lateral reflective part 115 is long, the quantity of light emitted from the lateral reflective part 115 (positive Y-axis side) is relatively small in the reflective part 130-1, but since the inclination angle of the second reflective surface 132 is relatively large, the quantity of light reflected in the direction (upward and vertical direction) of the symbol S1 by the second reflective surface 132 can be relatively large, and therefore, the luminance of the symbol S1 displayed on the display surface 111 can be set to an appropriate amount.

Further, for example, in the reflective part 130-2, since the distance L2 from the first lateral surface 113 is moderate, the quantity of light emitted from the first lateral surface 113 (negative Y-axis side) is moderate, but since the inclination angle of the reflective surface 131 with respect to the bottom surface 112 is moderate, the quantity of light reflected in the direction (upward and vertical direction) of the symbol S2 by the reflective surface 131 can be made moderate, and therefore, the luminance of the symbol S2 displayed on the display surface 111 can be made appropriate.

Further, since the distance L2' from the lateral reflective part 115 is moderate, the quantity of light emitted from the lateral reflective part 115 (positive Y-axis side) of the reflective part 130-2 is relatively moderate, but since the inclination angle of the second reflective surface 132 is moderate, the quantity of light reflected by the second reflective surface 132 in the direction (upward and vertical direction) of the symbol S2 can be made moderate, and therefore, the luminance of the symbol S2 displayed on the display surface 111 can be made appropriate.

Further, for example, the quantity of light emitted from the first lateral surface 113 (negative of Y-axis side) the reflective part 130-3 is relatively small because the distance L3 from the first lateral surface 113 is long, but since the inclination angle of the reflective surface 131 with respect to the bottom surface 112 is relatively large, the quantity of light reflected from the reflective surface 131 in the direction of the symbol S1 (upward and vertical direction) can be relatively large, and therefore the luminance of the symbol S3 displayed on the display surface 111 can be made appropriate.

Moreover, the quantity of light emitted from the lateral reflective part 115 (positive Y-axis side) of the reflective part 130-3 is relatively large because the distance L1' from the lateral reflective part 115 is short, but since the inclination angle of the second reflective surface 132 is relatively small, the quantity of light reflected from the second reflective surface 132 in the direction of the symbol S1 (upward and vertical direction) can be made relatively small, and therefore the luminance of the symbol S3 displayed on the display surface 111 can be made appropriate.

As described above, the display device 100 according to the first modification can easily make the luminance of the symbol S1 displayed on the display surface 111 of the light guide 110 equal to the luminance of the symbol S2 and the luminance of the symbol S3.

In the display device 100 according to the first modification, the light guide 110 has a symmetrical structure in the horizontal direction (Y-axis side) in order to uniformize the luminance of the symbol on the display surface 111 when the light source 120 is not lit.

Specifically, the distance L1 from the first lateral surface 113 of the reflective part 130-1 is equal to the distance L1' from the lateral reflective part 115 of the reflective part 130-3. The inclination angle of the reflective surface 131 of the reflective part 130-1 is equal to the inclination angle of the second reflective surface 132 of the reflective part 130-3. The inclination angle of the second reflective surface 132 of the reflective part 130-1 is equal to the inclination angle of the reflective surface 131 of the reflective part 130-3.

The distance L2 from the first lateral surface 113 of the reflective part 130-2 is equal to the distance L2' from the lateral reflective part 115 of the reflective part 130-2. The inclination angle of the reflective surface 131 of the reflective part 130-2 is equal to the inclination angle of the second reflective surface 132 of the reflective part 130-2.

Therefore, the width W of the recess 133 formed by the adjacent reflective surface 131 and the second reflective surface 132 is equal in the reflective parts 130-1, 130-2, and 130-3. Therefore, the projected area of the recess 133 on an XY plane can be made the same. Therefore, the size of the recess 133 can be made equal in all symbols, and by keeping the spacing (arrangement density) uniform, the luminance of each symbol can remain constant when the light source 120 is not lit.

In the example shown in FIG. 5, the reflective surface 131 and the second reflective surface 132 are configured to form a triangular shape (prism shape), but this is not limited, and the reflective surface 131 and the second reflective surface 132 may be configured to form other shapes (e.g., mooncut shape, etc.).

In addition, in the display device 100 according to the first modification, a second light source (e.g., LED) may be provided instead of the lateral reflective part 115. In this case, the display device 100-2 according to the first modification can also cause the light from the second lateral surface 114 (positive Y-axis side) to reach the reflective parts 130-1, 130-2, and 130-3, which results in improving the luminance of each symbol on the display surface 111. Furthermore, the symbol S2 may be omitted or symbols may be added.

Second Modification

Figure 6:
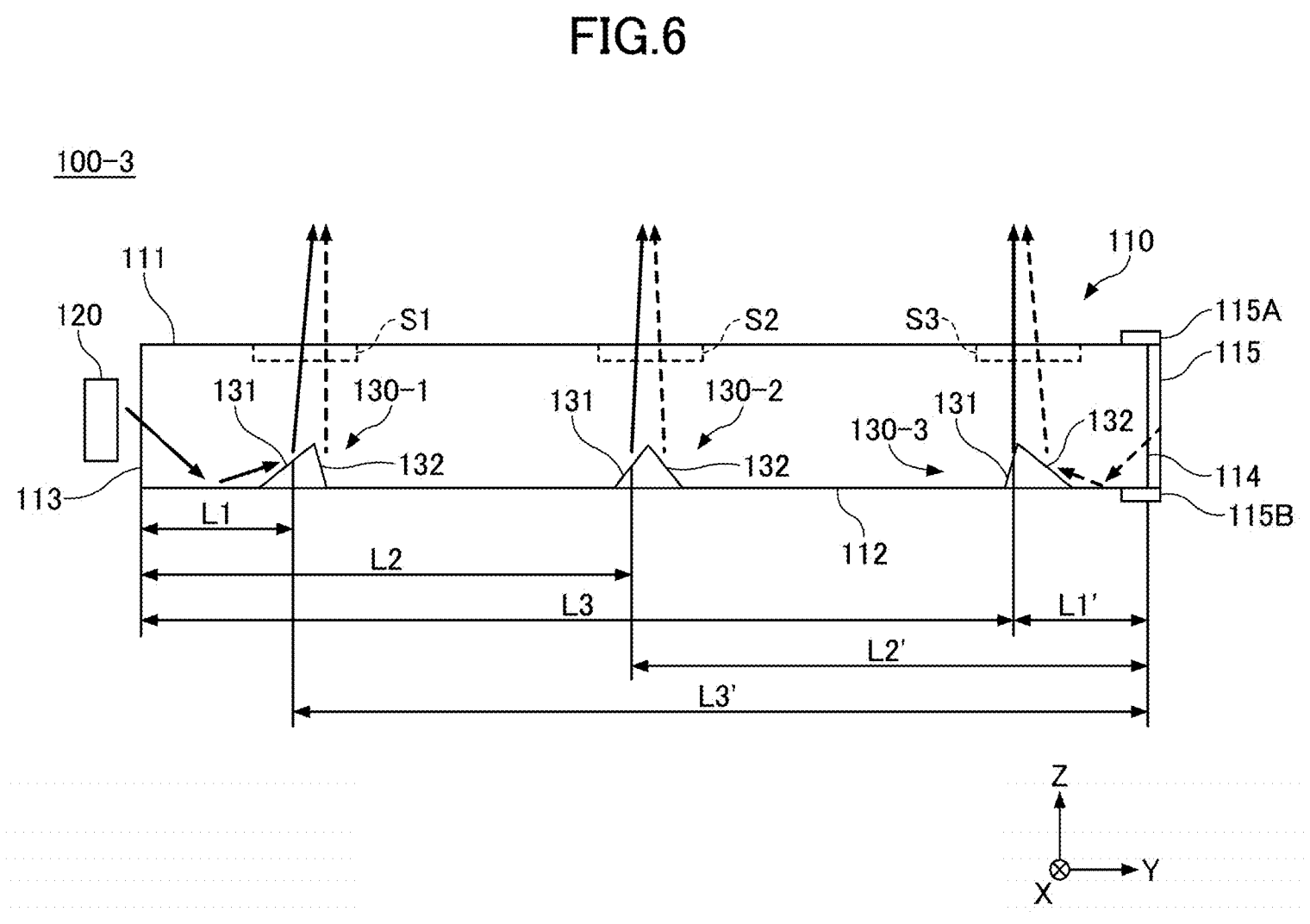

A second modification of the display device 100 according to one embodiment will be described below with reference to FIG. 6. FIG. 6 is a side view of a display device 100-3 according to the second modification.

As shown in FIG. 6, the display device 100-3 according to the second modification differs from the display device 100-2 according to the first modification in that an upper extended part 115A extending from an upper end to the first lateral surface 113 (negative Y-axis side) so as to cover a portion of the display surface 111, and a lower extended part 115B extending from a lower end to the first lateral surface 113 (negative Y-axis side) so as to cover a portion of the bottom surface 112.

In the display device 100-3 according to the second modification, the light reflected by the lateral reflective part 115 can be further reflected by the upper extended part 115A and the lower extended part 115B, so that leakage of light from the display surface 111 and the bottom surface 112 can be reduced.

Further, the present invention is not limited to these embodiments, but various variations and modifications may be made without departing from the scope of the present invention.

For example, the reflective surface may not be formed by forming a recess having an upward concave shape on the bottom surface of the light guide, but may be formed by forming a projection having a downwardly projecting shape on the bottom surface of the light guide.

The reflective surface may be formed by forming a recess having a downward concave shape on the display surface (upper surface) of the light guide, or may be formed by forming a projection having an upwardly projecting shape on the display surface (upper surface) of the light guide.

What is claimed is:
1. A display device, comprising:
a light source; and
a light guide which is transparent and flat, and into which light emitted from the light source is incident from a first lateral surface,
wherein:
the light guide includes reflective parts at positions corresponding to respective symbols, the reflective parts each including a plurality of reflective surfaces inclined relative to a bottom surface of the light guide;

each of the reflective parts reflects the light incident from the first lateral surface from the plurality of reflective surfaces, which results in displaying a corresponding one of the symbols on a display surface of the light guide;

the closer the reflective parts are to the light source, the smaller the inclination angles of the reflective surfaces relative to the bottom surface; and a projected area of each of the plurality of reflective surfaces is equal for all the reflective parts in plan view when viewed from a side where the display surface is.

2. The display device according to claim 1, wherein one of the reflective parts farthest from the light source has inclination angles of the plurality of reflective surfaces set to obtain maximum luminance when a symbol corresponding to the one of the reflective parts is viewed from a side where the display surface is.

3. The display device according to claim 1, wherein the inclination angles of the plurality of reflective surfaces are set for each of the reflective parts, so that the symbols displayed on the display surface have equal luminance.

4. The display device according to claim 1, wherein:

the light guide has a lateral reflective part on a second lateral surface opposite to the first lateral surface;

each of the reflective parts has a second reflective surface that is oriented toward the lateral reflective surface and that is integrally formed with a corresponding one of the plurality of reflective surfaces; and the closer the reflective parts are to the lateral reflective part, the smaller the inclination angles of the second reflective surfaces relative to the bottom surface.

5. The display device according to claim 4, wherein the lateral reflective part includes:

an upper extended part extending from an upper end to the first lateral surface so as to cover a portion of the display surface; and a lower extended part extending from a lower end to the first lateral surface so as to cover a portion of the bottom surface.

6. The display device according to claim 1, wherein the light source is provided only at a single end surface of the light guide.

7. The display device according to claim 1, wherein an inclination angle of each reflective surface relative to the bottom surface monotonically decreases as a distance from the light source decreases.

\* \* \* \* \*